Patented Feb. 9, 1937

2,069,943

UNITED STATES PATENT OFFICE 2,069,943

TREATMENT OF CELLULOSIC MATERIALS

Henry Dreyfus, London, England

No Drawing. Application July 13, 1933, Serial No. 680,251. In Great Britain July 27, 1932

9 Claims. (Cl. 92—11)

This invention relates to improvements in cellulosic materials, and more particularly to new or improved processes for the manufacture of celluloses eminently suitable for conversion into cellulose acetate or other cellulose esters or ethers.

It is well known that the commercial wood pulps are by no means satisfactory for the manufacture of cellulose acetate. Thus, soda cellulose pulp is highly resistant to acetylation, and hence is quite unsuitable for the purpose, while sulphite pulp, while it can be acetylated, nevertheless yields unsatisfactory products, probably because the acetylation is not uniform and is incomplete, so that the resulting solutions are hazy or fibrous.

The present invention relates to a process which is capable of producing celluloses which are eminently suitable for the manufacture of cellulose acetate and other cellulose esters and also for the manufacture of cellulose ethers.

I have found that highly satisfactory results may be obtained by a combined treatment in which the wood or other raw material is first treated with alkali, and especially with a dilute alkali, at relatively high temperatures, to remove or substantially remove the resins, lignins, or other non-cellulosic materials, and is then treated with an acid liquor containing sulphur dioxide either in the free state or in the form of a bisulphite or in both forms.

Thus, for instance, the wood pulp or other raw material may be treated under pressure, e. g. 7–10 atmospheres, with a solution of alkali of under 5% concentration, and especially of a concentration up to 3%, at temperatures for instance of 100–150 or 180° C. and especially at temperatures of 130–145° C. The best concentration for the alkali appears to be 1–2%. After treatment with the alkali the product may be separated from the liquor and is preferably washed, e. g. with very dilute alkali, and the residue is then treated with sulphur dioxide either combined or free or preferably both free and combined. Instead of removing the alkali from the first step, the appropriate amount of sulphur dioxide may be employed to form with the alkali either bisulphite or sulphite. The treatment with the sulphur dioxide is preferably carried out at elevated temperatures for example at temperatures of 100–140° C., and it may also be conducted under pressure, though this is not essential. It is found that by this means, though the normal result of the alkali step would be to render the cellulose resistant to acetylation, nevertheless the subsequent treatment with the sulphur dioxide and/or bisulphite overcomes this resistance and, moreover, results in celluloses which can be acetylated to clear solutions.

In the first step of my process caustic soda or caustic potash is preferably used in the concentration specified above. However, other alkalies, for example carbonated alkalies or even lime may be used and the concentration adjusted in accordance with the alkalinity. For the sulphite step of the process free sulphur dioxide may be used or sulphur dioxide in conjunction with the alkali already used during the first step of the process, or the sulphur dioxide may be wholly or partly combined in the form of a bisulphite, as, for instance, with soda, potash, lime, magnesia and the like. The calcium and magnesium bisulphites in conjunction with free sulphur dioxide are particularly useful for the purposes of the invention.

The above process may be applied to raw cellulosic materials and especially ligno cellulosic materials of any kind, for instance woods of all kinds, esparto, grasses and the like. Prior to the treatment woods may be comminuted or already formed mechanical wood pulps may be used. Pine and fir woods are particularly useful, through, of course, the invention is not limited thereto. The invention may, however, be applied to wood or other ligno cellulosic materials from which the lignin, pentosan, resin and like constituents have already been removed by the customary commercial process, as for example the sulphite, soda or sulphate processes. As already indicated, such wood pulps do not give satisfactory products on acetylation or conversion into other cellulose derivatives. By applying thereto the process of the present invention satisfactory products may be obtained. In the case of soda pulp, instead of applying the complete process of the present invention, the first step of the present invention comprising treatment with free alkali may be omitted, and sulphur dioxide, free and/or combined, may be applied directly to the soda pulp.

After treatment as described above, the materials may be converted directly into the desired cellulose derivatives, for example cellulose acetate, cellulose formate, cellulose propionate, cellulose butyrate or other esters or mixed esters of cellulose, for example cellulose nitro-acetate, or ethers, for example methyl, ethyl, oxyethyl or benzyl cellulose, or mixed ethers or mixed ether esters, for example ethyl cellulose acetate or oxyethyl cellulose acetate. However, such conversion to the cellulose derivatives may be preceded, especially in the case of manufacturing cellulose esters, by other pretreatments designed to increase the reactivity of the cellulose towards conversion. Thus for instance, the celluloses may be treated with lower aliphatic acids, for example formic acid, acetic acid, lactic acid and the like, such acids being employed in the liquid or dissolved state in large or small quantities, or in the vapour state with or without admixture with inert gases, as described in U. S. Patents Nos. 1,831,101 and 1,731,299. If desired, such pretreatment with aliphatic acids may be combined with the sulphiting step previously referred to. For instance, a wood material subjected to the first step of the process comprising treatment with alkali may be subjected directly to treatment with acetic acid containing sulphur dioxide, or alternatively an already formed soda pulp may be subjected to such a combined treatment. Preferably, such a treatment with sulphur dioxide and, for example, acetic acid is effected under pressure and at an elevated temperature.

Before acetylation and before or after any pretreatment with aliphatic acids, the cellulosic materials may be subjected to processes for removing any non-volatile mineral materials contained therein. For instance, where the alkali used in the first stage of the treatment is not wholly removed in a subsequent washing operation or in the subsequent sulphiting treatment, or where an alkali or alkaline earth or other metal bisulphite is used in the second stage of the treatment, it is desirable to remove said substances prior to acetylation or other esterification. When the materials are to be subjected to etherification such removal is not so important. The treatment with acetic acid, formic acid or like aliphatic acid may itself be the means of removing any mineral constituent contained in the materials, particularly if the treatment is effected at somewhat elevated temperatures. However, simple washing treatments, for example with acetic acid or formic acid or with other organic reagents or with water or aqueous reagents, may be employed. Where an acid salt is to be used in the esterification metallic compounds may be retained in the materials from the various processes preceding esterification, and may be converted for the purpose of esterifying into bisulphates or other acid salts by a suitable addition of sulphuric acid or other appropriate acid.

For the actual esterification any acetic acid or other lower aliphatic acid used in a pretreatment and which does not exert a deleterious effect upon the acetic anhydride or other esterifying agent may be allowed to remain in the materials, and similarly free sulphur dioxide is not disadvantageous to the esterification. Formic acid should, however, be removed or substantially removed when an anhydride is to be employed for the esterification. It need not, of course, be removed in a formylation process involving the use of formic acid and a catalyst. The invention is, however, of particular importance in relation to the manufacture of cellulose esters of organic acids by employing the corresponding anhydride as the esterifying agent. In the esterification any suitable catalyst may be employed, for example sulphuric acid, bisulphates, phosphoric acid, perchloric acid, sulphonic acids, for example of the aromatic or aliphatic series, sulphuryl chloride, zinc chloride, ferric chloride, stannic chloride or other metallic chlorides alone or in admixture with hydrochloric acid. Thus, for instance, the processes of any of U. S. Patents Nos. 1,280,975, 1,278,885, 1,280,974, 1,708,787, 1,911,069, 1,936,586, and 1,950,663 may be employed. Sulphuryl chloride may, if desired, be formed in the actual acetylating mixtures or at least in the presence of the cellulosic material, for example by interaction between residual sulphur dioxide present in the materials and chlorine.

An esterification may be effected so that the cellulose ester produced goes into solution by employing acetic acid or other solvent for the final cellulose ester as the esterifying medium, or it may be effected so that no solution of the resulting ester occurs, for instance by carrying out the esterification in presence of benzene, toluene, xylene, diethyl ether, di-isopropyl ether or other non-solvent for the cellulose ester produced. Even when employing such non-solvents for the cellulose ester as the esterifying media, it is desirable to have present acetic or other solvent for the cellulose ester, though, of course, in this case the proportion of such solvent will not be sufficient to bring about solution of the cellulose ester. By using the acetic acid or other solvent for the ester in a solution or suspension esterification process in relatively large proportions, for example more than six and preferably more than eight times the weight of the cellulose being esterified, as described in U. S. Patent No. 1,708,787, cellulose esters of high viscosity characteristics can be produced. This is important as it results in the manuafacture of high quality cellulose esters from comparatively cheap raw materials, and in particular the woods previously referred to. The temperature during esterification may be adjusted in accordance with the catalyst employed; for instance, sulphuryl chloride in general requires temperatures of the order of 50–60° C. to produce high quality products, while zinc chloride, ferric chloride, stannic chloride or like acidic salts alone or with hydrochloric acid in, for example, about equal proportions require somewhat lower temperatures, for instance, of the order of 20–40° C. Strong condensing agents, for instance sulphuric acid and phosphoric acid, should be used at low temperatures and particularly under 30° C. for the production of cellulose esters of medium or high viscosity characteristics. However, the invention is not limited to the production of such high quality esters and includes carrying out the esterification and/or a pretreatment or a subsequent ripening operation in such a manner that a comparatively low viscosity cellulose ester suitable, for instance, for lacquer purposes is obtained. Thus, the esterification may be conducted on the lines described in U. S. application S. No. 590,634 filed 3rd February, 1932, which shows esterifying cellulose in the presence of an esterifying agent and a strong esterifying catalyst, permitting the temperature to rise to about 50–55° C., and thereafter maintaining the temperature at about 40–55° C. until a product of the desired low viscosity characteristics is produced.

While anhydrides, and particularly acetic anhydride, have been more particularly referred to as the esterifying agents, the invention is not limited to such agents and includes also the use of nitric acid or a mixture of nitric acid and sulphuric acid for producing cellulose nitrates, formic acid for producing cellulose formates and acid chlorides for producing other organic esters of cellulose.

For manufacturing cellulose ethers from the cellulosic materials produced as previously described, any suitable etherifying agents can be employed, for example methyl chloride, dimethyl sulphate, ethyl chloride, diethyl sulphate, benzyl chloride, chlorhydrins, for instance ethylene chlorhydrin, epichlorhydrin (used either as an etherifying agent to produce a dioxy-propyl ether or to produce a chlor-oxy-propyl ether), or glycerine chlorhydrins, alkylene oxides, for example ethylene oxide or propylene oxide, allyl chloride, crotyl chloride and the like. Etherifying agents which are esters, for example of hydrochloric acid or sulphuric acid, should be used in conjunction with caustic soda, caustic potash, or other suitable inorganic or organic base, and in order to obtain the best cellulose ethers the concentration of the base or the amount of water present during etherification should be adjusted in accordance with the indications given in U. S. Patents Nos. 1,451,330, 1,451,331 and 2,010,850 and British Patent No. 277,721, that is to say by employing a quantity of water during etherification not exceeding 400% of the weight of the cellulose, and preferably not exceeding 150% of its weight, and by employing a quantity of alkali greater than the amount of water present, and preferably much greater, for example 3 or more times the amount of water present. The ethylene oxide type of etherifying agent may be employed in presence or absence of bases or acids though it is to be noted that in order to produce the chlorine-containing cellulose ether previously referred to epichlorhydrin shoud be employed in absence of caustic alkalies.

The cellulose esters or ethers produced according to the processes previously referred to may be worked up in any desired manner. Cellulose ethers should be thoroughly purified from by-products, for example ethers or alcohols corresponding with the etherifying agent used, and for this purpose washing may be resorted to, preferably with the aid of emulsifying agents, and with aqueous or organic liquids. A complete solution of the ether in a suitable organic liquid followed by fractional precipitation of the ether from the impurities may be employed for purification. Cellulose esters may be subjected to ripening processes so as to eliminate combined catalysts if necessary and/or to confer upon the cellulose esters the desired solubility characteristics, as for instance solubility in acetone. Such processes may be carried out by any suitable methods, for example those described in British specifications Nos. 20,977/1911 and 20,852/1912, U. S. Patent No. 1,217,722 and U. S. application S. No. 590,634 filed 3rd February, 1932. In such secondary treatments or ripening operations any mineral acid or strongly acidic reagent present may be, and preferably is, neutralized or partially neutralized if the ripening is to be carried out at elevated temperatures, for example 50–100° C. However, in most cases the desired solubility characteristics may be obtained at much lower temperatures, for example of the order of 20–40° C. Cellulose ethers may likewise be subjected to the action of mineral acids or other acidic reagents either while in solution in organic solvents or in suspension in organic or aqueous liquids, such processes having as principal object changing the solubility characteristics or changing the viscosity characteristics of the cellulose ether.

The cellulose esters and ethers produced by the present invention may be worked into any desired products, for example artificial silk or other artificial fibres, ribbons, foils, films, varnishes, dopes, plastic masses, moulding powders and the like.

The following examples are given by way of illustration only and are not to be considered as limiting the invention in any way:—

Example 1

One part by weight of wood in the form of chips and 12–15 parts by weight of 2–3% sodium hydroxide are introduced into a digester and heated therein by blowing in steam at a temperature of 140–150° C. The pressure is released at intervals so as to assist in the circulation of the mass. Heating is carried out for 6–10 hours or until the lignin content is reduced to a substantially constant value. At the conclusion of the operation the alkaline liquors are run off and the wood pulp is washed with alkali of a concentration of about .5%, the temperature being maintained at about 60–100° C. during the washing operation.

When the mass has been washed free from the cooking liquor sulphur dioxide is blown in and the pulp is heated at 100–120° C. for 2–3 hours at a pressure of 4–6 atmospheres. The pulp is then washed and dried and may be employed for the manufacture of cellulose derivatives in any suitable manner, with or without further pretreatment, e. g. with organic acids.

Example 2

A commercial soda pulp is heated at 120–140° C. for 5–10 hours with about 10 times its weight of glacial acetic acid saturated with sulphur dioxide at a pressure of 2–3 atmospheres. The pulp may then be separated and used for the manufacture of cellulose derivatives, or if desired, when it is intended to manufacture a cellulose ester, esterification may be effected without separation of the acid, e. g. by incorporating the required amount of acetic or other anhydride with the mass, introducing chlorine in an amount sufficient to convert the sulphur dioxide into sulphuryl chloride and heating at 50–60° C.

Example 3

One part by weight of wood chips are treated with sodium hydroxide as in Example 1 and washed. They are then heated at 100–120° C. with four parts by weight of a liquor containing about 1% of free sulphur dioxide and .5% of sulphur dioxide in the form of calcium bisulphite. The treatment is carried out for 8–10 hours at a pressure of 3–4 atmospheres. On completion the pressure is reduced, the liquors are run off and the pulp washed. It may then be treated with glacial acetic acid or in any other suitable manner, according to the cellulose derivative which it is desired to manufacture.

The phrase "solution of sulphur dioxide" where employed in the following claims is to be understood, where the context permits, to include a solution containing sulphur dioxide in the free state and/or in the combined state as bisulphite.

What I claim and desire to secure by Letters Patent is:—

1. Process for the treatment of lignocellulosic materials, which comprises treating such materials with a dilute solution of caustic alkali of 1 to 5% concentration and subsequently subjecting them to treatment with an acid solution of sulphur dioxide, the treatments being carried out at an elevated temperature of 100–180° C.

2. Process for the treatment of lignocellulosic materials, which comprises substantially removing the lignins from the materials by treatment with a solution of an alkaline compound of an alkali or alkaline earth metal in concentration equivalent to 1 to 5% of caustic alkali and subsequently subjecting the materials to treatment with an acid solution of sulphur dioxide, the treatments being carried out at an elevated temperature of 100–180° C.

3. Process for the treatment of lignocellulosic materials, which comprises substantially removing the lignins from the materials by treatment and under pressure with a solution of caustic alkali of concentration of 1 to 5% and subsequently subjecting the materials under pressure to treatment with an acid solution of sulphur dioxide, the treatments being carried out at an elevated temperature of 100–180° C.

4. Process for the treatment of wood pulps and like materials still containing lignins, which comprises substantially removing the lignins from the materials by treatment and under pressure with a solution of caustic alkali of concentration of 1 to 5% and subsequently subjecting the materials under pressure to treatment with an acid solution of sulphur dioxide, the treatments being carried out at an elevated temperature of 100–180° C.

5. Process for the treatment of wood pulps and like materials still containing lignins, which comprises substantially removing the lignins from the materials by treatment under pressure with a solution of caustic alkali of 1 to 2% concentration and subsequently subjecting the materials under pressure to treatment with an acid solution of sulphur dioxide, the treatments being carried out at an elevated temperature of 100–180° C.

6. Process for the treatment of wood pulps and like materials still containing lignins, which comprises substantially removing the lignins from the materials by treatment at a temperature of 130–145° C. and under pressure with a solution of caustic alkali of concentration of 1 to 5% and subsequently subjecting the materials at an elevated temperature of 100–180° C. and under pressure to the action of an acid solution of sulphur dioxide.

7. Process for the treatment of wood pulps and like materials still containing lignins, which comprises substantially removing the lignins from the materials by treatment at an elevated temperature of 100–180° C. and under pressure with a solution of caustic alkali of concentration of 1 to 5% and subsequently subjecting the materials under pressure to the action of an acid solution of sulphur dioxide at a temperature of 100–140° C.

8. Process for the treatment of wood pulps and like materials still containing lignins, which comprises substantially removing the lignins from the materials by treatment at a temperature of 130–145° C. and under pressure with a solution of caustic alkali of 1 to 2% concentration and subsequently subjecting the materials under pressure to the action of an acid solution of sulphur dioxide at a temperature of 100–140° C.

9. Process for the treatment of lignocellulosic materials, which comprises substantially removing the lignins from the materials by treatment with a solution of an alkaline compound of an alkali or alkaline earth metal in concentration equivalent to 1 to 5% of caustic alkali and subsequently subjecting the materials at an elevated temperature of 100–180° C. to the action of a solution of sulphur dioxide in a lower aliphatic acid.

HENRY DREYFUS.